(12) United States Patent
Kania et al.

(10) Patent No.: US 11,816,495 B2
(45) Date of Patent: *Nov. 14, 2023

(54) FEEDBACK ANALYSIS FOR VIRTUAL MACHINES MANAGER SCHEDULING

(71) Applicant: INTERNATIONAL BUSINESS MACHINES CORPORATION, Armonk, NY (US)

(72) Inventors: Piotr Kania, Cracow (PL); Wlodzimierz Martowicz, Cracow (PL); Piotr Padkowski, Lodz (PL); Marek Peszt, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 607 days.

This patent is subject to a terminal disclaimer.

(21) Appl. No.: 15/894,980

(22) Filed: Feb. 13, 2018

(65) Prior Publication Data

US 2018/0181427 A1    Jun. 28, 2018

Related U.S. Application Data

(63) Continuation of application No. 15/170,053, filed on Jun. 1, 2016, now Pat. No. 9,940,158, which is a
(Continued)

(51) Int. Cl.
*G06F 9/455* (2018.01)
*G06F 9/48* (2006.01)

(52) U.S. Cl.
CPC ......... *G06F 9/45558* (2013.01); *G06F 9/485* (2013.01); *G06F 9/4843* (2013.01);
(Continued)

(58) Field of Classification Search
CPC .... G06F 9/45558; G06F 9/4843; G06F 9/485; G06F 2009/4557; G06F 2009/45575; G06F 2009/45591
See application file for complete search history.

(56) References Cited

U.S. PATENT DOCUMENTS 8,701,115 B2   4/2014   Bhandari et al.
9,430,269 B1   8/2016   Kania et al.
(Continued)

FOREIGN PATENT DOCUMENTS

CN   101763274 A    6/2010
CN   103150203 A    6/2013
DE   10201601779 A1 8/2016

OTHER PUBLICATIONS

IEEE, "IWQoS 2010", 18th IEEE International Workshop on Quality of Service, Jun. 16-18, 2010, Tsinghua University, Beijing, China.
(Continued)

*Primary Examiner* — Sisley N Kim
(74) *Attorney, Agent, or Firm* — L. Jeffrey Kelly

(57) ABSTRACT

Embodiments of the present invention include a method for running a virtual manager scheduler for scheduling activities for virtual machines. The method may include: defining a schedule for one or more activities to be executed for a virtual machine; applying an adjustment to the schedule in accordance with feedback information received via a virtual machine client aggregating the feedback information from a plurality of virtual machine clients, each being related to a virtual machine, per scheduled activity type; and determining of a group adjustment for a determined group of the virtual machine clients based on a function of the feedback information of the plurality of virtual machine clients.

20 Claims, 6 Drawing Sheets

Related U.S. Application Data continuation of application No. 15/162,964, filed on May 24, 2016, now Pat. No. 9,934,063, which is a continuation of application No. 14/616,898, filed on Feb. 9, 2015, now Pat. No. 9,430,269.

(52) U.S. Cl.
CPC .............. *G06F 2009/4557* (2013.01); *G06F 2009/45575* (2013.01); *G06F 2009/45591* (2013.01)

(56) References Cited

U.S. PATENT DOCUMENTS

| | | | | |
|---|---|---|---|---|
| 9,804,890 | B1* | 10/2017 | Pai | G06F 9/455 |
| 2007/0234337 | A1* | 10/2007 | Suzuki | G06F 8/61 |
| | | | | 717/168 |
| 2010/0064293 | A1 | 3/2010 | Kang et al. | |
| 2010/0138475 | A1* | 6/2010 | Frank | H04L 47/125 |
| | | | | 709/203 |
| 2011/0154320 | A1* | 6/2011 | Verma | H04W 4/60 |
| | | | | 718/1 |
| 2011/0185063 | A1 | 7/2011 | Head et al. | |
| 2011/0209145 | A1* | 8/2011 | Chen | G06F 9/45504 |
| | | | | 718/1 |
| 2012/0089980 | A1 | 4/2012 | Sharp et al. | |
| 2012/0110572 | A1 | 5/2012 | Kodi et al. | |
| 2013/0111470 | A1* | 5/2013 | Bozek | G06F 9/4881 |
| | | | | 718/1 |
| 2014/0040912 | A1 | 2/2014 | Davidson et al. | |
| 2014/0089916 | A1* | 3/2014 | Gross | G06F 11/0727 |
| | | | | 718/1 |
| 2014/0297842 | A1* | 10/2014 | Yoshimoto | G06F 3/0625 |
| | | | | 709/224 |
| 2016/0266926 | A1 | 9/2016 | Kania et al. | |
| 2016/0274935 | A1 | 9/2016 | Kania et al. | |

OTHER PUBLICATIONS

Gong et al., "vPnP: Automated Coordination of Power and Performance in Virtualized Datacenters", Department of Electrical and Computer Engineering Wayne State University, Detroit, MI., Quality of Service (IWQoS), 2010 18th International Workshop on Jun. 16-18, 2010.

IBM: List of IBM Patents or Patent Applications Treated as Related (Appendix P), Feb. 13, 2018, 2 pages.

* cited by examiner

FEEDBACK ANALYSIS FOR VIRTUAL MACHINES MANAGER SCHEDULING

BACKGROUND

Embodiments of the present invention relates generally to virtual machines (VMs) and more specifically, to a method for running a virtual manager scheduler for scheduling activities for virtual machines. Embodiments may relate further to a virtual manager scheduler unit for scheduling activities for virtual machine and a related computer program product.

Using virtual machines running on a virtual resource manager, virtual machine manager (VMM), or hypervisor in order to utilize available hardware better is commonplace these days. However, once deployed, VMs have a tendency to run forever (i.e., they are not killed/terminated or deleted after use or have to undergo regular maintenance tasks). Manual maintenance management is one option; automated management of VMs is another. Often, these automated management tasks or activities are not performed in suitable hours for users of the VMs because the management tasks are scheduled to a fixed time table and may disturb a user working with the virtual machine.

SUMMARY

According to one embodiment, a method for running a virtual manager scheduler for scheduling activities for virtual machines is provided. The method may include defining a schedule for one or more activities, in particular, maintenance activities, to be executed for a virtual machine, and applying an adjustment to the schedule in accordance with feedback information receivable via a virtual machine client, in particular, from a user.

The method may further include aggregating feedback information from a plurality of virtual machine clients, each being related to a virtual machine, per scheduled activity type, and determining of a group adjustment for a determined group of the virtual machine clients based on a function of the feedback information of the plurality of virtual machine clients.

According to another embodiment, a virtual manager scheduler unit for scheduling activities for virtual machines is provided. The virtual manager scheduler unit may include a definition module adapted for defining a schedule for one or more activities to be executed for a virtual machine and an adjustment unit adapted to applying an adjustment to the schedule in accordance with feedback information receivable via a virtual machine client module.

The virtual manager scheduler unit may also include an aggregator unit adapted for aggregating the feedback information from a plurality of virtual machine clients, each being related to a virtual machine, per scheduled activity type and a determination unit adapted for determining of a group adjustment for a determined group of the virtual machine clients based on a function of the feedback information of the plurality of virtual machine clients.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which not all structures may be shown.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
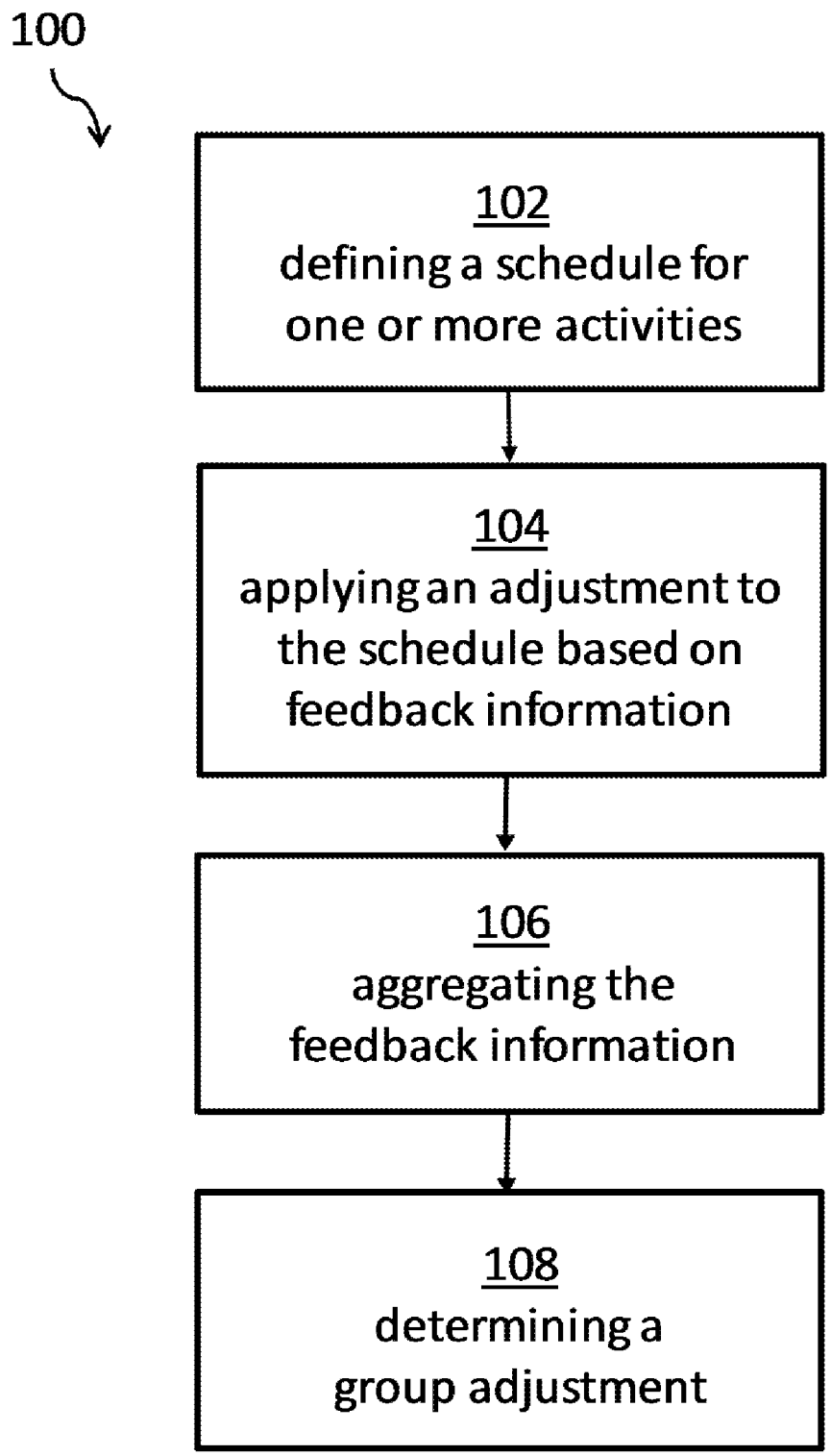
FIG. 1 shows a block diagram of the inventive method for running a virtual manager scheduler for scheduling activities for virtual machines.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

It should be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

In the context of this description, the following conventions, terms and/or expressions may be used. The term "virtual machine" may denote a software emulation of a particular physical computer system. Virtual machines (VMs) may operate based on the computer architecture and functions of a real or hypothetical computer and their implementations may involve specialized hardware, software, or a combination of both. Virtual machines are typically deployed on top of a hypervisor which is instrumental in isolating a virtual machine against a physical machine.

The term "hypervisor" may denote a software layer executed directly on the hardware of a computer system and may include: a resource manager that manages physical resources of the computer system; a processor manager that manages the computer processor(s); and a hardware emulator that creates and manages a plurality of virtual machines. An operating system may be executed on each one of the plurality of virtual machines and transparently share the plurality of computer processors and physical resources through the hypervisor layer. Operating systems in different virtual machines may be different to each other.

When a VM is suspended, the current state of the definition of the VM as well as the status of the operating system, applications, and all relating data is saved. When resuming the VM, the operating system, applications, and data may continue at the same point the VM has been suspended. When a VM is not in use, it may be shut down to release underlying computer system resources. Shutting down a VM is analogous to a regular shutdown of a physical computer. No operating status may be saved. Killing a VM may be equivalent to performing a power off of a VM, similar to unplugging the power cable from a physical computer. It may be performed in case of an error or if a regular shut down may fail.

The term "activities" may denote action performed to or with virtual machines. Examples of these activities may include starting a VM, stopping or shutting down a VM, deleting or killing a VM, suspending a VM (i.e., putting it in a sleep or hibernate mode), or updating a VM, (e.g., with new device drivers). Also, backing up of a VM or performing a snapshot may belong to these activities.

The term "schedule" may denote a timetable defining points in time for activities to be executed for a VM as described above. The term "adjustment" may denote a deviation from planned points in time of a schedule. An adjustment may be given as a delta time to a given point in time for a planned activity or an absolute hour.

The term "virtual machine client" may denote a component which may be available for each VM. It may be enabled to display a schedule to a user and may also be enabled to receive input from a user regarding adjustments to the schedule. The virtual machine client may also be enabled to detect status information of the VM (e.g., active, not active). Such status information may be used instead of the feedback information and may be sent to the virtual manager scheduler unit by the virtual machine client.

The term "virtual manager scheduler unit" may denote a component comprising software code and/or hardware elements adapted to manage and control activity schedules for a plurality of virtual machines. The virtual manager scheduler unit may also be adapted to build groups of activities relating to different virtual machines based on feedbacks (i.e., feedback information) received via virtual machine clients from different virtual machines.

Embodiments of the present invention, including the proposed method for running a virtual manager scheduler for scheduling activities for virtual machines may offer advantages over conventional processes. End user or user requests and feedback regarding activity schedules may be handled directly by a communication between a virtual machine client and a virtual manager scheduler unit. Input may come directly from a use of the virtual machine. Users of a virtual machine may also be informed about planned activities based on the schedule. The virtual manager scheduler unit may also be aware of a real usage of virtual machines supported.

According to an embodiment of the method, the schedule may include time information for the virtual machine. The time information may include active hours during a day of the virtual machine, active days during a week of the virtual machine, point in time of maintenance activities (e.g., updates for device drivers or other code portions), a point in time of a deletion or killing or shut down (e.g., if an expiration time of a virtual machine may have been reached or a support contract may have ended), a point in time for a snapshot of the virtual machine, a backup time, a point in time for putting the virtual machine in a sleep mode, and a point in time for reactivating or resuming the virtual machine. A skilled person may apply more and other activities to a virtual machine.

The virtual machine client may render the schedule for the one or more activities to a user interface for usage by a user. Feedback information may be received back from the user regarding details of the schedule for the one or more activities, and the feedback information may be sent back to the virtual machine manager. Thus, a closed-loop information cycle is provided.

The active hours and active days may be validated by the virtual machine client based on a session status of a virtual machine. Thus, feedback information may not only be received via a user input via the virtual machine client but may also be measured directly and automatically. The feedback information may include information about declining or postponing a next upcoming activity, a user identifier, an activity identifier, a user identifier specific adjustment to the schedule, a textual explanation, and a timestamp. Hence, a complete set of information regarding an activity and a change to a related schedule may become available within the virtual manager scheduler unit.

Determining the group adjustment for the determined group of the virtual machines may include determining a feedback rank for one or more of the activities and each associated period of time. For example, if for a certain virtual machine a certain activity is scheduled for a preferred point in time, a group may be built for these certain virtual machines and/or activities. A rank may be higher the higher the number of feedback information for a certain activity is. If, for example, the virtual manager scheduler unit received first feedback information expressing "shut down the VM at 8:00 pm every day" from one or more VM clients, this first feedback information is ranked higher than a second feedback information expressing "update device drivers for the VM at 9:00 pm every second day". A skilled person will know equivalent examples. The function of the feedback information may be based on a threshold value of feedback information, in particular, number of users who delivered feedback information or an average of individual adjustments being used for generating the group adjustment for a specific activity.

The virtual machine client may receive an updated schedule for the one or more activities. This may happen, for example, after a user may have entered that feedback information regarding a schedule for at least one activity for a specific virtual machine into the virtual machine client and an updated schedule may have been determined by the virtual manager scheduler unit. The updated schedule may also be displayed to a user via the virtual machine client.

In the following, a detailed description of the figures will be given. All instructions in the figures are schematic. Firstly, a block diagram of an embodiment of the inventive method for running a virtual manager scheduler for scheduling activities for virtual machines is given. Afterwards, further embodiments as well as embodiments of the virtual manager scheduler unit for scheduling activities for virtual machines will be described.

FIG. 1 shows a block diagram of an embodiment of the method 100 for running a virtual manager scheduler for scheduling activities for virtual machines. The method 100 may include defining 102 a schedule for one or more activities to be executed for a virtual machine. The method may also include applying 104 an adjustment to the schedule in accordance with feedback information received via a virtual machine client, in particular, from a user. Furthermore, the method may also include aggregating 106 the feedback information from a plurality of virtual machine clients per scheduled activity type, wherein each virtual machine client is related to a virtual machine. Finally, the method may be adapted for determining 108 of a group adjustment for a determined group of the virtual machine clients based on a function of the feedback information of the plurality of virtual machine clients.

Figure 2:
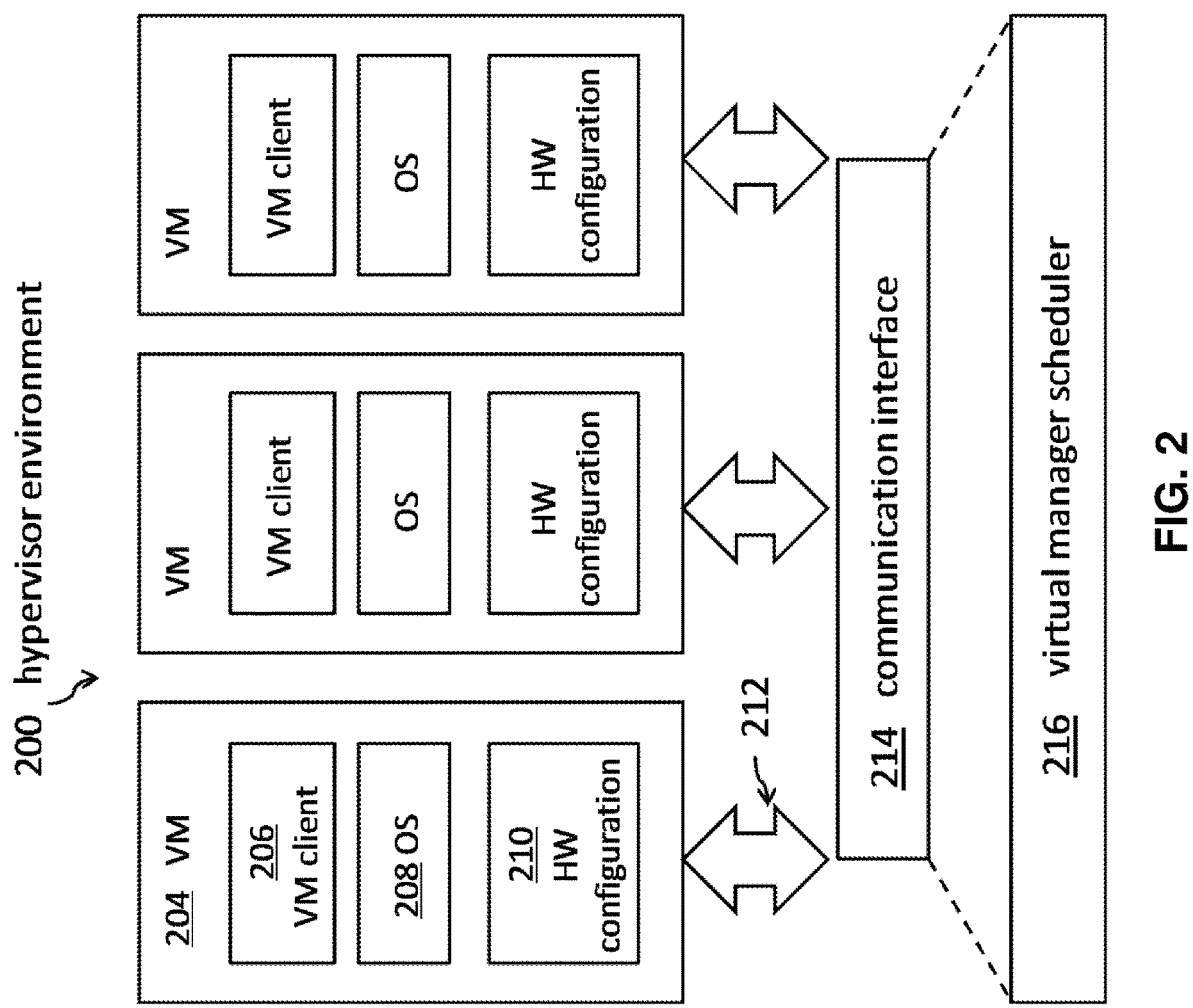
FIG. 2 shows a block diagram of an embodiment of a hypervisor with virtual machines and a virtual manager scheduler unit.

FIG. 2 shows a block diagram of a computing environment with a hypervisor 200 comprising virtual machines 204 and a virtual manager scheduler 216 or a virtual manager scheduler unit 216. In particular, each virtual machine 204 may include a virtualized hardware configuration 210, an operating system 208, and at least a virtual machine client 206. It may be noted that only the most left virtual machine 204 shows these additional reference numerals being used. Each virtual machine 204 communicates 212 with a communication interface 214 which may be part of the virtual manager scheduler unit 216. Both, the communication interface 214 and the virtual manager schedule unit 216 may as well be part of the hypervisor 200.

Figure 3:
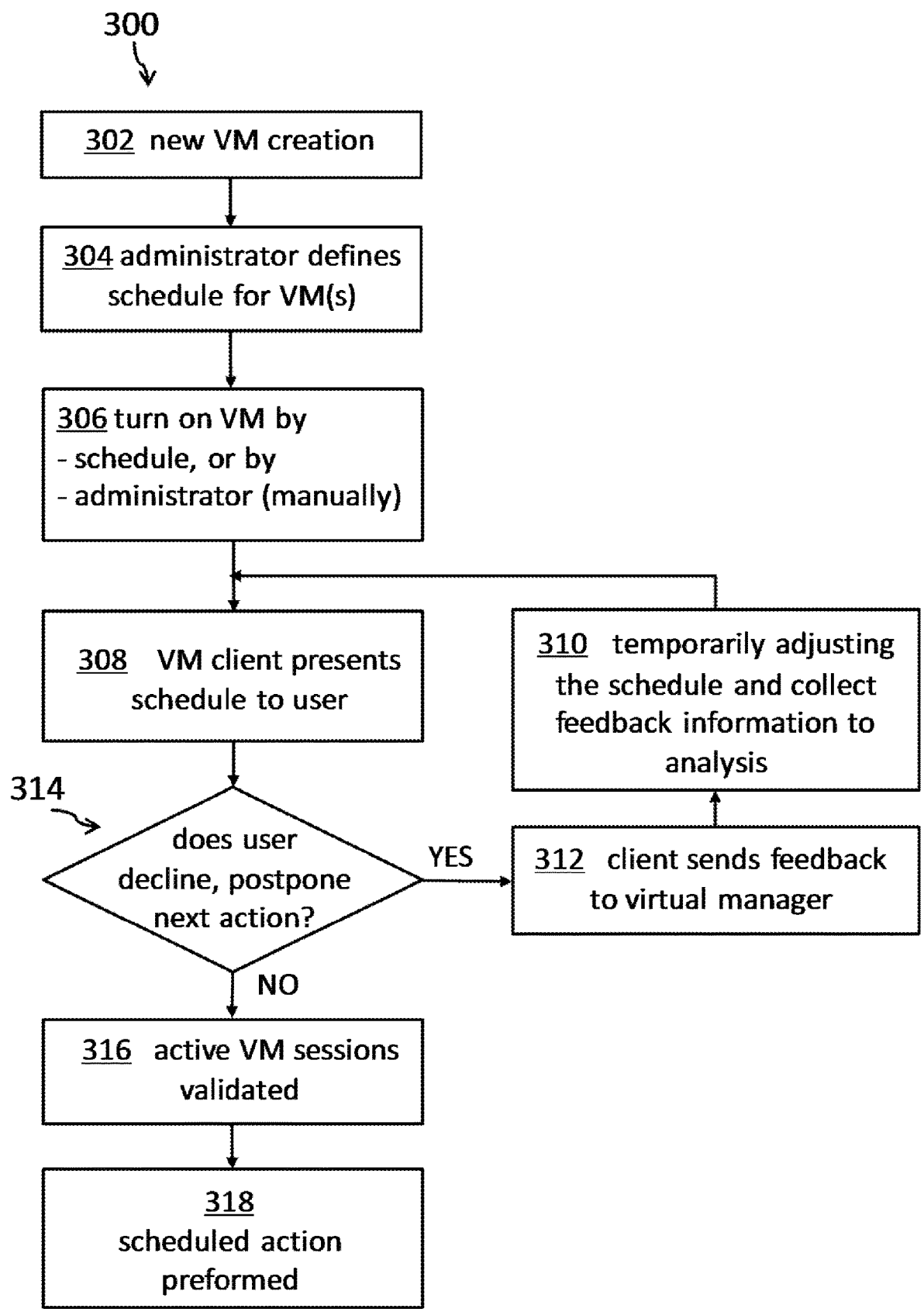
FIG. 3 shows a flowchart of the method according to FIG. 1.

FIG. 3 shows a block diagram 300 of a flowchart related to an embodiment of the present invention. One or more VMs may be created 302. An administrator may define 304 activity schedules for these created virtual machines. At a point in time 306, a virtual machine may be turned on based on the schedule, or based on a manual operation of an administrator. The schedule information may be presented 308 to a user. The user may react to the displayed schedule. The user may decline or postpone a next scheduled action or activity 314. If the user decides to do so, the virtual machine client sends 312 feedback information to the virtual manager scheduler unit. Then, as shown in step 310, the schedule for this particular virtual machine may be adjusted temporarily and other feedback information may be collected by the virtual manager scheduler unit for additional analysis. As a next step, the updated schedule may be presented 308 again to the user via the virtual machine client. If the user does not decide to decline or postpone a next activity 314, the virtual manager scheduler unit may validate 316 active sessions for virtual machines, and the virtual manager schedule unit may perform 318 scheduled actions.

Figure 4:
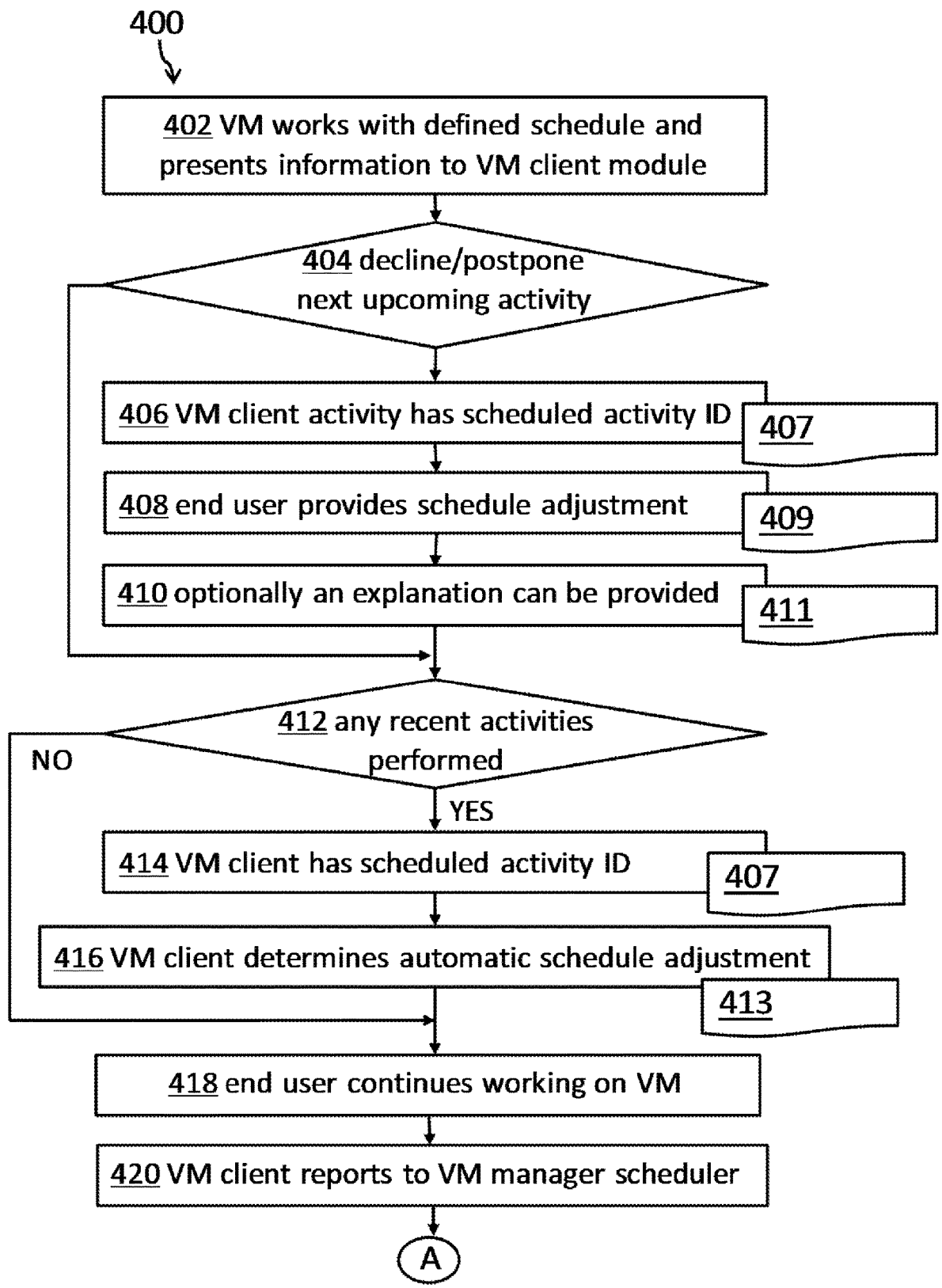
FIG. 4 shows a more detailed flowchart of the method according to FIG. 1 and FIG. 3.

FIG. 4 shows a block diagram of a detailed flowchart 400 relating to an embodiment of the present invention. Initially, a virtual machine may work 402 with a defined schedule and may represent this information to the virtual machine client 206 (FIG. 2). As discussed above, the user may decide to decline or postpone 404 a next upcoming activity. The virtual machine client 206 may then provide 406 an identifier (ID) 407 for a scheduled activity. Additionally, an end-user may provide 408 in particular by the virtual machine client, a schedule adjustment 409. Optionally, an explanation 411 may be provided 410 via the virtual machine client. Then it may be decided 412 whether any recent activities may have been performed. If "NO," the process may continue with block 418: the end-user continues to work with the virtual machine. In case of "YES," the virtual machine client has a recently scheduled activity ID 414 and the virtual machine client 206 (FIG. 2) determines 416, based on a recently performed VM activity (e.g., the status of the virtual machine), an automatic schedule adjustment 413. Then the end-user may continue 418 working on the virtual machine. Additionally, the automatic schedule adjustment 413 may be communicated 212 (FIG. 2) by the virtual machine client 206 (FIG. 2) to the virtual manager scheduler unit 216 (FIG. 2) as shown in step 420.

Figure 5:
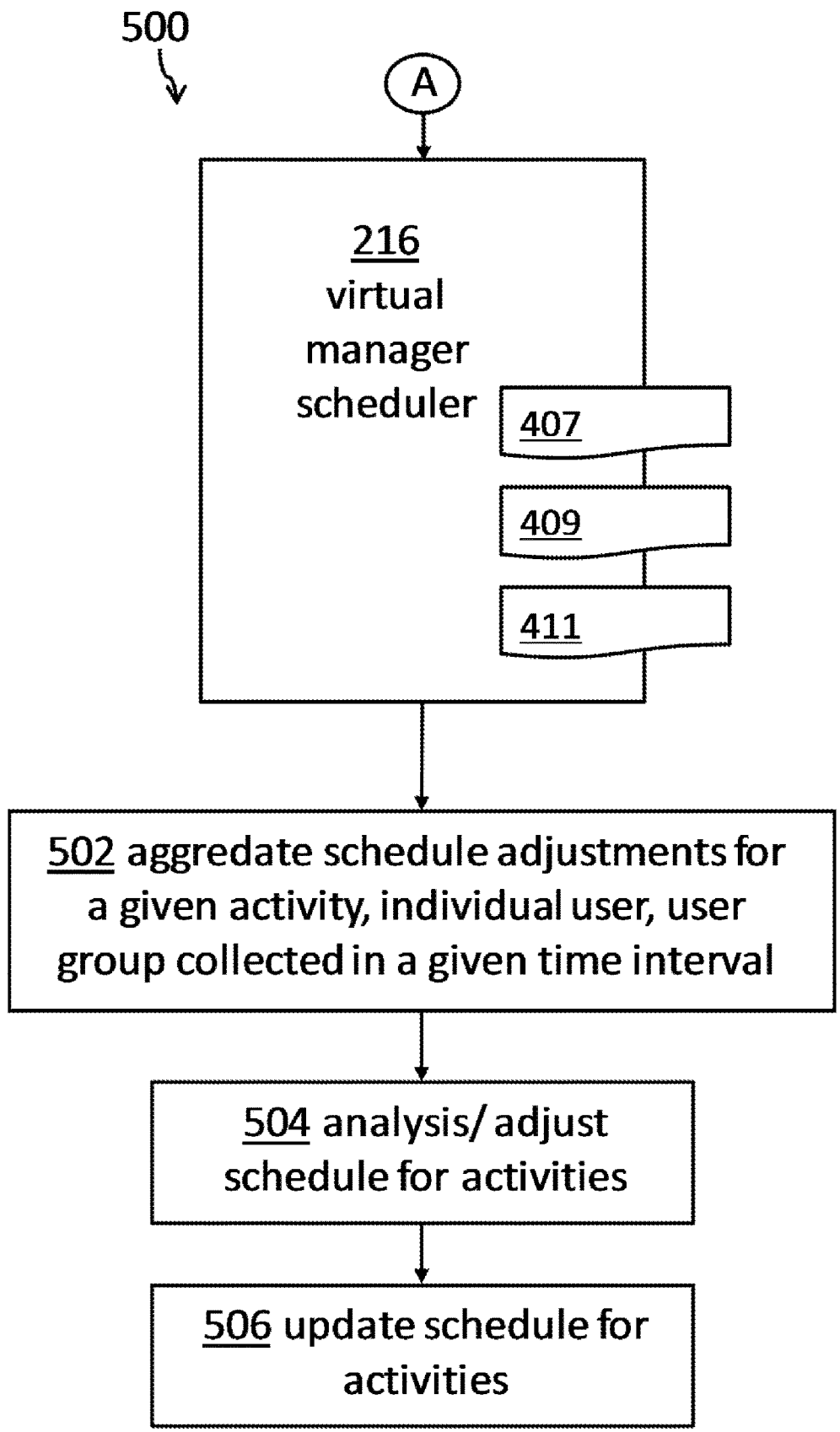
FIG. 5 shows a second part of an embodiment of the more detailed flowchart of the method according to FIG. 1 and FIG. 3.

FIG. 5 shows a block diagram 500 comprising a continuation of the process described above with reference to FIG. 4 which ends at "A". FIG. 5 continues the process at "A". The virtual manager scheduler unit 216 may now have received input in the form of: the identifier of the activity 407, a schedule adjustment 409, and an optional explanation 411. The virtual manager scheduler unit 216 may then aggregate 502 schedule adjustments for a given activity, individual users and/or a plurality of users in a given time interval. Based on an analysis and/or a ranking of the received information, groups of virtual machines and/or groups of activities may be defined 504. Based on this, schedules for activities for certain VMs may be updated 506.

Figure 6:
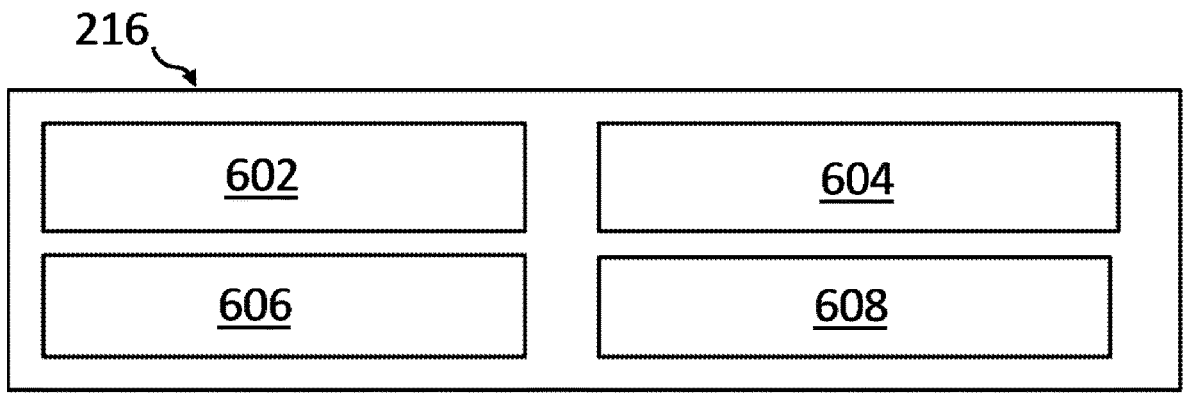
FIG. 6 shows a block diagram of the virtual manager scheduler unit.

FIG. 6 shows a block diagram of a virtual manager scheduler unit 216 for scheduling activities for virtual machines 204. The virtual manager scheduler unit 216 may include a definition module 602 adapted for defining a schedule for one or more activities to be executed for a virtual machine 204. The virtual manager scheduler unit 216 may also include an adjustment unit 604 adapted for to applying an adjustment to the schedule in accordance with feedback information received via a virtual machine client module 206. Furthermore, the virtual manager schedule unit 216 may include an aggregator unit 606 adapted for aggregating the feedback information from a plurality of virtual machine clients 206, each being related to a virtual machine 204 per scheduled activity type. Moreover, the virtual manager scheduler unit 216 may also include a determination unit 608 adapted for determining of a group adjustment for a determined group of the virtual machine clients 206 based on a function of the feedback information of the plurality of virtual machine clients 206.

Figure 7:
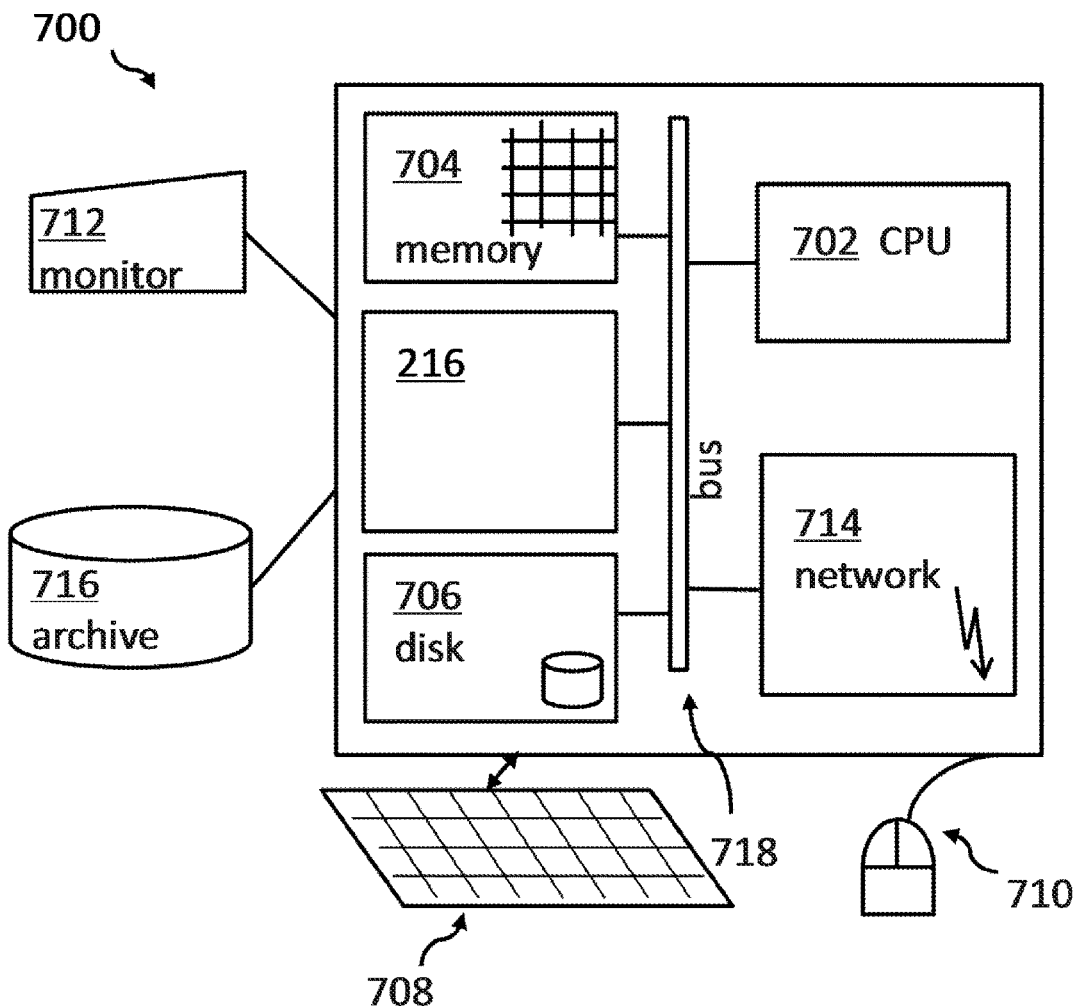
FIG. 7 shows an embodiment of a computer for use with the inventive method or the virtual manager scheduler unit.

Referring to FIG. 7, embodiments of the invention may be implemented together with virtually any type of computer, regardless of the platform being suitable for storing and/or executing program code. A computing system 700 may include one or more processor(s) 702 with one or more cores per processor, associated memory elements 704, an internal storage device 706 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 704 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, a virtual manager scheduler unit 216 for scheduling activities for virtual machines 204 may be attached to the bus system 718.

The computing system 700 may also include input means such as a keyboard 708, a pointing device such as a mouse 710, or a microphone (not shown). Alternatively, the computing system may be equipped with a touch sensitive screen as main input device. Furthermore, the computer 700, may include output means such as a monitor or screen 712 (e.g., a liquid crystal display (LCD), a plasma display, a light emitting diode display (LED), or cathode ray tube (CRT) monitor). The computer system 700 may be connected to a network (e.g., a local area network (LAN), a wide area network (WAN)), such as the Internet or any other similar type of network, including wireless networks via a network interface connection 714. This may allow a coupling to other computer systems, or a storage network, or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may be a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein may include an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which may include one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method for running a virtual manager scheduler for scheduling activities, for virtual machines, the method comprising:
    defining, by the virtual manager scheduler, an activity schedule for a virtual machine, the activity schedule comprising a timetable defining points in time for scheduled activities to be executed for the virtual machine;
    receiving, by the virtual manager scheduler, user feedback information directly from one or more virtual machine clients;
    automatically adjusting, by the virtual manager scheduler, the activity schedule for at least one of the scheduled activities based on the user feedback information received directly from the one or more virtual machine clients;
    aggregating, by the virtual manager scheduler, the user feedback information received directly from the one or more virtual machine clients based on activity type, wherein each virtual machine client is related to a different virtual machine; and
    determining, by the virtual manager scheduler, a group adjustment for the one or more virtual machine clients based on the user feedback information received from the one or more virtual machine clients, wherein determining the group adjustment comprises determining a feedback rank for one of the scheduled activities and an associated period of time for the one scheduled activity.

2. The method of claim 1, wherein the one or more virtual machine clients renders the activity schedule to a user interface, receives the user feedback information regarding details of the activity schedule, and sends the user feedback information to a virtual machine manager.

3. The method of claim 1, further comprising:
    validating active hours of the virtual machine and active days of the virtual machine by the one or more virtual machine clients based on a session status of a virtual machine.

4. The method of claim 1, wherein the user feedback information comprises information about declining or postponing a next upcoming activity, an activity identifier, a user identifier specific adjustment to the activity schedule, a textual explanation, or a timestamp.

5. The method of claim 1, wherein the function of the user feedback information is based on a threshold value of the user feedback information or an average of individual adjustments being used for generating the group adjustment.

6. The method of claim 1, wherein the one or more virtual machine clients receive an updated schedule for the scheduled activities.

7. The method of claim 1, wherein the user feedback information received directly from the one or more virtual machine clients includes information regarding the timetable for at least one of the scheduled activities.

8. The method of claim 1, wherein a higher feedback rank is associated with a higher number of feedback and a lower feedback rank is associated with a lower number of feedback.

9. A method for running a virtual manager scheduler for scheduling activities, for virtual machines, the method comprising:
- defining, by the virtual manager scheduler, an activity schedule for a virtual machine, the activity schedule comprising a timetable defining points in time for scheduled activities to be executed for the virtual machine, the timetable comprises active hours during a day of the virtual machine, active days during a week of the virtual machine, a point in time for a maintenance activity, a point in time for a deletion activity, a point in time for a shut-down activity, a point in time for a backup activity, a point in time for putting the virtual machine in a sleep mode, or a point in time for resuming the virtual machine from the sleep mode;
- receiving, by the virtual manager scheduler, user feedback information directly from one or more virtual machine clients;
- adjusting, by the virtual manager scheduler, the activity schedule for at least one of the scheduled activities based on user feedback information received directly from the one or more virtual machine clients;
- aggregating, by the virtual manager scheduler, the user feedback information received from the one or more virtual machine clients per activity type; and
- determining, by the virtual manager scheduler, a group adjustment for the one or more virtual machine clients based on the aggregated user feedback information, wherein determining the group adjustment comprises determining a feedback rank for one of the scheduled activities and an associated period of time for the one scheduled activity.

10. The method of claim 9, wherein the one or more virtual machine clients renders the activity schedule to a user interface, receives the user feedback information regarding details of the activity schedule, and send the user feedback information to a virtual machine manager.

11. The method of claim 9, further comprising:
- validating active hours of the virtual machine and active days of the virtual machine by the one or more virtual machine clients based on a session status of a virtual machine.

12. The method of claim 9, wherein the user feedback information comprises information about declining or postponing a next upcoming activity, a user identifier, an activity identifier, a user identifier specific adjustment to the activity schedule, a textual explanation, or a timestamp.

13. The method of claim 9, wherein the function of the user feedback information is based on a threshold value of the user feedback information or an average of individual adjustments being used for generating the group adjustment.

14. The method of claim 9, wherein the one or more virtual machine clients receive an updated schedule for the scheduled activities.

15. A method for running a virtual manager scheduler for scheduling activities, for virtual machines, the method comprising:
- defining, by the virtual manager scheduler, an activity schedule for a virtual machine, the activity schedule comprising a timetable defining points in time for scheduled activities to be executed for the virtual machine, the timetable comprises active hours during a day of the virtual machine, active days during a week of the virtual machine, a point in time for a maintenance activity, a point in time for a deletion activity, a point in time for a shut-down activity, a point in time for a snapshot of the virtual machine, a point in time for a backup activity, a point in time for putting the virtual machine in a sleep mode, and a point in time for resuming the virtual machine from the sleep mode;
- receiving, by the virtual manager scheduler, user feedback information directly from one or more virtual machine clients;
- adjusting, by the virtual manager scheduler, the activity schedule for at least one of the scheduled activities based on user feedback information received directly from the one or more virtual machine clients;
- aggregating, by the virtual manager scheduler, the user feedback information received from the one or more virtual machine clients based on activity type, wherein each virtual machine client is related to a different virtual machine; and
- determining, by the virtual manager scheduler, of a group adjustment for the one or more virtual machine clients based the user feedback information received from the one or more virtual machine clients.

16. The method of claim 15, wherein the one or more virtual machine clients renders the activity schedule to a user interface, receives the user feedback information regarding details of the activity schedule, and sends the user feedback information to a virtual machine manager.

17. The method of claim 15, further comprising:
- validating active hours of the virtual machine and active days of the virtual machine by the one or more virtual machine clients based on a session status of a virtual machine.

18. The method of claim 15, wherein the user feedback information comprises information about declining or postponing a next upcoming activity, a user identifier, an activity identifier, a user identifier specific adjustment to the activity schedule, a textual explanation, or a timestamp.

19. The method of claim 15, wherein the function of the user feedback information is based on a threshold value of the user feedback information or an average of individual adjustments being used for generating the group adjustment.

20. The method of claim 15, wherein the one or more virtual machine clients receive an updated schedule for the scheduled activities.

\* \* \* \* \*